United States Patent [19]

Amini et al.

[11] Patent Number: 5,644,729

[45] Date of Patent: Jul. 1, 1997

[54] BIDIRECTIONAL DATA BUFFER FOR A BUS-TO-BUS INTERFACE UNIT IN A COMPUTER SYSTEM

[75] Inventors: Nader Amini; Bechara Fouad Boury; Sherwood Brannon, all of Boca Raton; Richard Louis Horne, Boynton Beach; Terence Joseph Lohman, Boca Raton, all of Fla.

[73] Assignee: International Business Machines Corporation, Armonk, N.Y.

[21] Appl. No.: 282,159

[22] Filed: Jul. 28, 1994

Related U.S. Application Data

[63] Continuation of Ser. No. 816,691, Jan. 2, 1992, abandoned.

[51] Int. Cl.⁶ ............................................. G06F 13/00
[52] U.S. Cl. .................. 395/250; 395/840; 395/878; 395/308; 395/481; 364/239
[58] Field of Search ............................. 395/250, 275, 395/280, 258, 840, 878, 308, 481; 364/239

[56] References Cited

U.S. PATENT DOCUMENTS

| | | | |
|---|---|---|---|
| 4,218,740 | 8/1980 | Bennett et al. | 364/200 |
| 4,258,418 | 3/1981 | Heath | 364/200 |
| 4,298,954 | 11/1981 | Bigelow et al. | 395/250 |
| 4,571,671 | 2/1986 | Burers et al. | 364/200 |
| 4,607,328 | 8/1986 | Furukawa et al. | 364/200 |
| 4,703,420 | 10/1987 | Irwin | 364/200 |
| 4,831,520 | 5/1989 | Rubinfeld et al. | 364/200 |
| 4,878,166 | 10/1989 | Johnson et al. | 395/425 |
| 4,979,097 | 12/1990 | Triolo et al. | 364/200 |
| 4,982,321 | 1/1991 | Pantry et al. | 364/200 |
| 5,003,465 | 3/1991 | Chisholm et al. | 364/200 |
| 5,097,410 | 3/1992 | Hester et al. | 295/275 |
| 5,097,437 | 3/1992 | Lorson | 395/775 |
| 5,117,486 | 5/1992 | Clark et al. | 395/250 |
| 5,155,810 | 10/1992 | McNamara et al. | 395/250 |
| 5,179,663 | 1/1993 | Zimura | 395/250 |
| 5,202,969 | 4/1993 | Sato et al. | 395/425 |
| 5,224,213 | 6/1993 | Dieffenderfer et al. | 395/250 |
| 5,283,883 | 2/1994 | Mishler | 395/425 |
| 5,301,343 | 4/1994 | Alvarez | 395/800 |
| 5,327,545 | 7/1994 | Begun et al. | 395/425 |
| 5,345,559 | 9/1994 | Okazaki et al. | 395/250 |

FOREIGN PATENT DOCUMENTS

| | | | |
|---|---|---|---|
| 0 311 704 | 10/1987 | European Pat. Off. | G06F 13/14 |
| 0 380 844 | 6/1989 | European Pat. Off. | G06F 9/46 |
| 0 365 116 | 7/1989 | European Pat. Off. | G06F 13/16 |

*Primary Examiner*—Christopher B. Shin
*Attorney, Agent, or Firm*—Calfee, Halter & Griswold LLP

[57] ABSTRACT

A method and system are provided for controlling data transfer between a system memory connected to a system bus and at least one input/output (I/O) device connected to an I/O bus in a computer system. The system bus is coupled to the I/O bus by a bus interface unit comprising a first pair of buffers connected in series between the I/O bus and the system bus, and a second pair of buffers connected in series between the I/O bus and the system bus and in parallel with the first pair of buffers. Each of the buffers in each of the pairs is used for bidirectional data transfer between the system bus and the I/O bus.

11 Claims, 5 Drawing Sheets

BIDIRECTIONAL DATA BUFFER FOR A BUS-TO-BUS INTERFACE UNIT IN A COMPUTER SYSTEM

This is a continuation of application Ser. No. 07/816,691, filed on Jan. 2, 1992, now abandoned.

RELATED APPLICATIONS

The following United States patent applications are incorporated herein by reference as if they had been fully set out:

application Ser. No. 07/815,992 Filed Jan. 2, 1992, Entitled "BUS CONTROL LOGIC FOR COMPUTER SYSTEM HAVING DUAL BUS ARCHITECTURE", now U.S. Pat. No. 5,544,346 application Ser. No. 07/816,116 Filed Jan. 2, 1992, Entitled "ARBITRATION CONTROL LOGIC FOR COMPUTER SYSTEM HAVING DUAL BUS ARCHITECTURE", now U.S. Pat. No. 5,265,211.

application Ser. No. 07/816,184 Filed Jan. 2, 1992, Entitled "PARITY ERROR DETECTION AND RECOVERY", now U.S. Pat. No. 5,313,627 application Ser. No. 07/816,204 Filed Jan. 2, 1992, Entitled "CACHE SNOOPING AND DATA INVALIDATION TECHNIQUE" (Further identified as Attorney Docket BC9-91-092).

application Ser. No. 07/816,203 Filed Jan. 2, 1992, Entitled "BUS INTERFACE LOGIC FOR COMPUTER SYSTEM HAVING DUAL BUS ARCHITECTURE", now U.S. Pat. No. 5,255,374 application Ser. No. 07/816,693 Filed Jan. 2, 1992, Entitled "BUS INTERFACE FOR CONTROLLING SPEED OF BUS OPERATION" (Further identified as Attorney Docket BC9-91-106).

application Ser. No. 07/816,698 Filed Jan. 2, 1992, Entitled "METHOD AND APPARATUS FOR DETERMINING ADDRESS LOCATION AT BUS TO BUS INTERFACE" (Further identified as Attorney Docket BC9-91-107).

1. Field of the Invention

The present invention relates to bus to bus interfaces in a computer system having dual bus architecture, and more particularly to a bus to bus interface unit and method for temporarily storing data being transferred between two buses of the system.

2. Background of the Invention

Generally in computer systems and especially in personal computer systems, data is transferred between various system devices such as a central processing unit (CPU), memory devices, and direct memory access (DMA) controllers. In addition, data is transferred between expansion elements such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus controllers (i.e., devices which can control the computer system) and bus slaves (i.e., elements which are controlled by bus controllers).

Personal computer systems having more than one bus are known. Typically, a local bus is provided over which the CPU communicates with cache memory or a memory controller, and a system I/O bus is provided over which system bus devices such as the DMA controller, or the I/O devices, communicate with the system memory via the memory controller. The system I/O bus comprises a system bus and an I/O bus connected by a bus interface unit. The I/O devices communicate with one another over the I/O bus. The I/O devices are also typically required to communicate with system bus devices such as system memory. Such communications must travel over both the I/O bus and the system bus through the bus interface unit.

In passing data between the system bus and the I/O bus, it is often necessary to be able to accommodate devices coupled to one or both of said buses which operate at significantly different speeds and in different modes of data transfer. For example, there may be devices coupled to the I/O bus that write in bandwidths of 1, 2 and 4 bytes. On the other hand, the system bus may be capable of transfering 16 byte packets of information in what is known as burst transmissions which are quite fast. Moreover, it is often desirable to transfer a relatively large amount of data from contiguous addresses. Such transfer would be desirable and less time consuming if it were accomplished without having to initiate a request specific to each address location.

Thus, it is necessary that any interconnection between the system bus and I/O bus be able to handle data transfer at different rates and in different modes. Further, it is desirable that data be transferred efficiently to/from contiguous addresses without initiating a transfer request for each location.

Accordingly, it is an object of the present invention to provide an efficient data buffer between a system bus and an I/O bus which will transfer data effectively and efficiently at different transfer rates and in different modes.

SUMMARY OF THE INVENTION

According to the present invention, a bus to bus interface unit is provided for computer systems having dual bus architecture, such as a system bus and an I/O bus. The bus interface unit includes an asynchronous bidirectional temporary data storage function for data being transferred between the two buses to and from devices coupled to each of the two buses. Preferably the storage function operates in modes that will accommodate individual transfers of data, data streaming, and data burst transfers, and can accommodate transfers of information from contiguous addresses without initiating a new request for each address.

DETAILED DESCRIPTION OF THE PREFERRED EMBODIMENT

Figure 1:
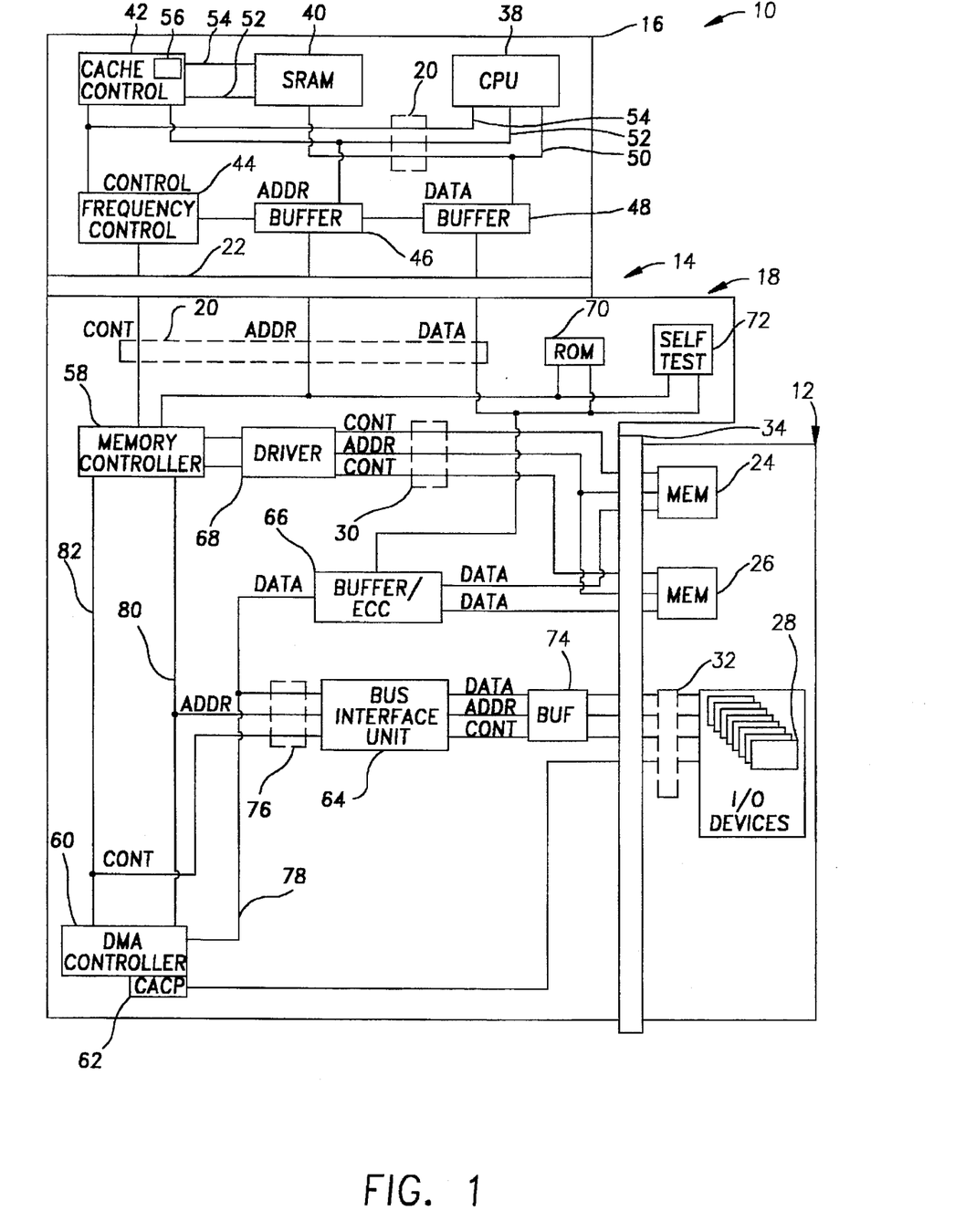
FIG. 1 is a schematic block diagram of a computer system incorporating a bus interface unit constructed according to the principles of the present invention.

Referring first to FIG. 1, a computer system shown generally at 10 comprises system board 12 and processor complex 14. Processor complex includes processor portion 16 and base portion 18 connected at processor local bus 20 via local bus connector 22. Processor portion 16 operates at 50 MHz and base portion 18 operates at 40 MHz.

System board 12 includes interleaved system memories 24 and 26 and input/output (I/O) devices 28. Communications between memories 24 and 26 and processor complex 14 are handled by memory bus 30, and communications between I/O devices 28 and processor complex 14 are carried by I/O bus 32. Communications between I/O devices and memories 24 and 26 are handled by I/O bus 32, system bus 76 and memory bus 30. I/O bus 32 may conform to MICRO CHANNEL® computer architecture. Memory bus 30 and I/O bus 32 are connected to processor complex base portion 18 via processor complex connector 34. I/O devices such as memory expansion devices may be connected to the computer system 10 via I/O bus 32. System board 12 may also include conventional video circuitry, timing circuitry, keyboard control circuitry and interrupt circuitry (none of which are shown) which may be used by computer system 10 during normal operation.

Processor portion 16 of processor complex 14 includes central processing unit (CPU) 38 which, in the preferred embodiment, is a 32-bit microprocessor available from Intel, Inc. under the trade designation i486. Processor portion 16 also includes static random access memory (SRAM) 40, cache control module 42, frequency control module 44, address buffer 46 and data buffer 48. Local bus 20 comprises data information path 50, address information path 52 and control information path 54. Data information paths 50 are provided between CPU 38, SRAM 40 and data buffer 48. Address information paths 52 are provided between CPU 38, cache control module 42 and address buffer 46 Control information paths 54 are provided between CPU 38, cache control module 42 and frequency control module 44. Additionally, address and control information paths are provided between cache control module 42 and SRAM 40.

SRAM 40 provides a cache function by storing in short term memory information from either system memories 24 or 26 or from expansion memory which is located on an I/O device 28. Cache control module 42 incorporates random access memory (RAM) 56 which stores address locations of memories 24 and 26. CPU 38 may access information cached in SRAM 40 directly over the local bus 20. Frequency control module 44 synchronizes operation of the 50 Mhz processor portion 16 with the 40 MhZ base portion 18 and also controls the operation of buffers 46 and 48. Accordingly, frequency control module 44 determines the times at which information is captured by buffers 46 and 48 or the times at which information that is stored in these buffers is overwritten. Buffers 46 and 48 are configured to allow two writes from memories 24 and 26 to be stored simultaneously therein. Buffers 46 and 48 are bi-directional, i.e., they are capable of latching information which is provided by the CPU 38 and information which is provided to the CPU. Because buffers 46 and 48 are bi-directional, processor portion 16 of the processor complex 14 may be replaced or upgraded while maintaining a standard base portion 18.

Base portion 18 includes memory controller 58, direct memory access (DMA) controller 60, central arbitration control point (CACP) circuit 62, bus interface unit 64 and buffer/error correction code (ECC) circuit 66. Base portion 18 also includes driver circuit 68, read only memory (ROM) 70, self test circuit 72 and buffer 74. System bus 76 comprises a data information path 78, and address information path 80 and a control information path 82. The data information path connects buffer 74 with bus interface unit 64; bus interface unit 64 with DMA controller 60 and buffer/ECC circuit 66; and buffer/ECC circuit 66 with system memories 24 and 26. The address information path and the control information path each connect memory controller 58 with DMA controller 60 and bus interface unit 64; and bus interface unit 64 with buffer 74.

Memory controller 58 resides on both CPU local bus 20 and system bus 76, and provides the CPU 38, the DMA controller 60 or bus interface unit 64 (on behalf of an I/O device 28) with access to system memories 24 and 26 via memory bus 30. The memory controller 58 initiates system memory cycles to system memories 24 and 26 over the memory bus 30. During a system memory cycle, either the CPU 38, the DMA controller 60 or bus interface unit 64 (on behalf of an I/O device 28) has access to system memories 24 and 26 via memory controller 58. The CPU 38 communicates to system memory via local bus 20, memory controller 58 and memory bus 30, while the DMA controller 60 or bus interface unit 64 (on behalf of an I/O device 28) access system memory via system bus 76, memory controller 58 and memory bus 30.

For CPU 38 to I/O bus 32 read or write cycles, address information is checked against system memory address boundaries. If the address information corresponds to an I/O expansion memory address or I/O port address, then memory controller 58 initiates an I/O memory cycle or I/O port cycle with an I/O device 28 (via bus interface unit 64) over the I/O bus 32. During a CPU to I/O memory cycle or I/O port cycle, the address which is provided to memory controller 58 is transmitted from system bus 76 to I/O bus 32 via bus interface unit 64 which resides intermediate these two buses. The I/O device 28 which includes the expansion memory to which the address corresponds receives the memory address from I/O bus 32. DMA controller 60 and the bus interface unit 64 control the interchange of information between system memories 24 and 26 and expansion memory which is incorporated into an I/O device 28. DMA controller 60 also provides three functions on behalf of processor complex 14. First, the DMA controller 60 utilizes a small computer subsystem control block (SCB) architecture to configure DMA channels, thus avoiding the necessity of using programmed I/O to configure the DMA channels. Second, DMA controller provides a buffering function to optimize transfers between slow memory expansion devices and the typically faster system memory. Third, DMA controller 60 provides an eight channel, 32-bit, direct system memory access function. When providing the direct system memory access function, DMA controller 60 may function in either of two modes. In a first mode, DMA controller 60 functions in a programmed I/O mode in which the DMA controller is functionally a slave to the CPU 38. In a second mode, DMA controller 60 itself functions as a system bus master, in which DMA controller 60 arbitrates for and controls I/O bus 32. During this second mode, DMA controller 60 uses a first in, first out (FIFO) register circuit.

CACP circuit 62 functions as the arbiter for the DMA controller, I/O device bus controllers and the CPU (if accessing I/O devices). CACP circuit 62 receives arbitration control signals from DMA controller 60, memory controller 58 as well as from I/O devices, and determines which devices may control the I/O bus 32 and the length of time during which the particular device will retain control of the I/O bus.

Driver circuit 68 provides control information and address information from memory controller 58 to system memories 24 and 26. Driver circuit 68 drives this information based upon the number of single in-line memory modules (SIMMs) which are used to construct system memories 24 and 26. Thus, driver circuit 68 varies the signal intensity of the control and address information which is provided to system memories 24 and 26 based upon the size of these memories.

Buffer circuit 74 provides amplification and isolation between processor complex base portion 18 and system board 12. Buffer circuit 74 utilizes buffers which permit the capture of boundary information between I/O bus 32 and bus interface unit 64 in real time. Accordingly, if computer system 10 experiences a failure condition, buffer circuit 74 may be accessed by a computer repair person to determine the information which was present at connector 34 upon failure of the system.

ROM 70 configures the system 10 upon power-up by initially placing in system memory data from expansion memory. Self test circuit 72, which is connected to a plurality of locations within base portion 18, provides a plurality of self test features. Self test circuit 72 accesses buffer circuit 74 to determine if failure conditions exist, and also tests the other major components of base portion 18 upon power-up of the system 10 to determine whether the system is ready for operation.

Figure 2:
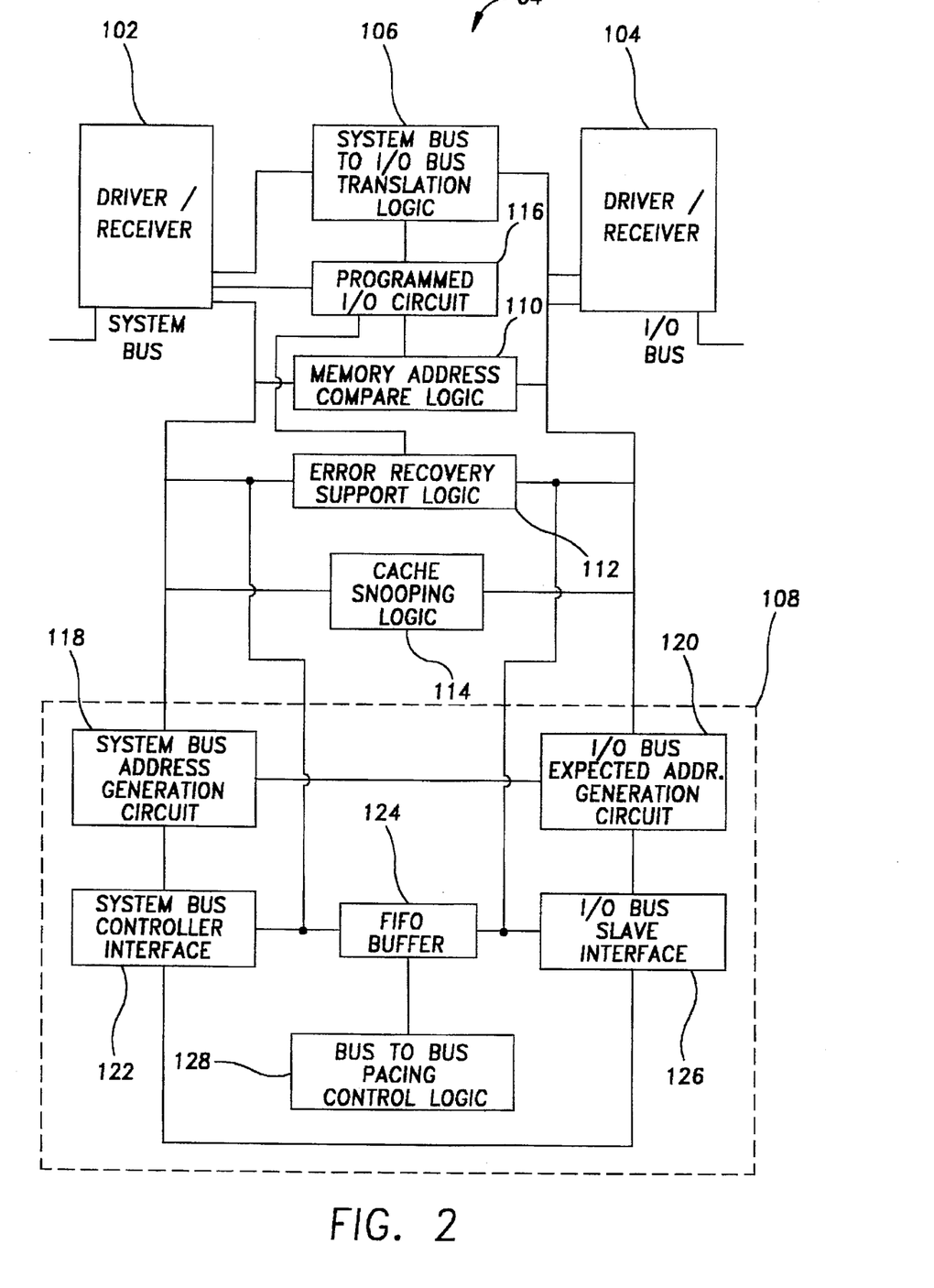
FIG. 2 is a schematic block diagram of the bus interface unit of the computer system of FIG. 1.

Referring to FIG. 2, a schematic block diagram of the bus interface unit 64 of the system of FIG. 1 is shown. Bus interface unit 64 provides the basis for implementation of the present invention by providing a bi-directional high speed interface between system bus 76 and I/O bus 32.

Bus interface unit 64 includes system bus driver/receiver circuit 102, I/O bus driver/receiver circuit 104 and control logic circuits electrically connected therebetween. Driver/receiver circuit 102 includes steering logic which directs signals received from the system bus 76 to the appropriate bus interface unit control logic circuit and receives signals from the bus interface unit control logic circuits and directs the signals to the system bus 76. I/O bus driver/receiver circuit 104 includes steering logic which directs signals received from the I/O bus 32 to the appropriate bus interface unit control logic circuit and receives signals from the bus interface unit control logic circuits and directs the signals to the I/O bus 32.

The bus interface unit control logic circuits include system bus to I/O bus translation logic 106, I/O bus to system bus translation logic 108, memory address compare logic 110, error recovery support logic 112, and cache snooping logic 114. Programmed I/O circuit 116 is also electrically coupled to system driver/receiver circuit 102.

The system bus to I/O bus translation logic 106 provides the means required for the DMA controller 60 or the memory controller 58 (on behalf of CPU 38) to act as a system bus controller to access the I/O bus 32 and thereby communicate with I/O devices 28 acting as slave devices on the I/O bus. Translation logic 106 translates the control, address and data lines of the system bus 76 into similar lines on the I/O bus 32. Most control signals and all address signals flow from the system bus 76 to the I/O bus 32 while data information flow is bi-directional. The logic which acts as system bus slave monitors the system bus 76 and detects cycles which are intended for the I/O bus 32. Upon detection of such a cycle, the system bus slave translates the timing of signals on the system bus to I/O bus timing, initiates the cycle on the I/O bus 32, waits for the cycle to be completed, and terminates the cycle on the system bus 76.

The I/O bus to system bus translation logic 108 comprises system bus address generation circuit 118, I/O bus expected address generation circuit 120, system bus controller interface 122, FIFO buffer 124, I/O bus slave interface 126 and bus to bus pacing control logic 128. System bus controller interface 122 supports a high performance 32 bit (4 byte) i486 burst protocol operating at 40 MHZ. Data transfers of four, eight and sixteen bytes in burst mode and one to four bytes in no-burst mode are provided. I/O bus slave interface 126 monitors the I/O bus 32 for operations destined for slave devices on the system bus 76 and ignores those operations destined for the I/O bus 32. All cycles picked up by the I/O bus slave interface 126 are passed on to the FIFO buffer 124 and the system bus controller interface 122.

The I/O bus to system bus translation logic 108 provides the means required for an I/O device 28 to act as an I/O bus controller to access system bus 76 and thereby read or write to system memories 24 and 26. In either of these operations, an I/O device controls the I/O bus. The asynchronous I/O bus interface 126, operating at the speed of the I/O device, permits the bus interface unit 64 to act as a slave to the I/O device controller on the I/O bus 32 to decode the memory address and determine that the read or write cycle is destined for system memories 24 or 26. Simultaneously, the system bus controller interface 122 permits the bus interface unit 64 to act as a controller on the system bus 74. The memory controller 58 (FIG. 2) acts as a slave to the bus interface unit 64, and either provides the interface 64 with data read from system memory or writes data to system memory. The reads and writes to system memory are accomplished through the FIFO buffer 124, a block diagram of which is illustrated in FIG. 3.

Figure 3:
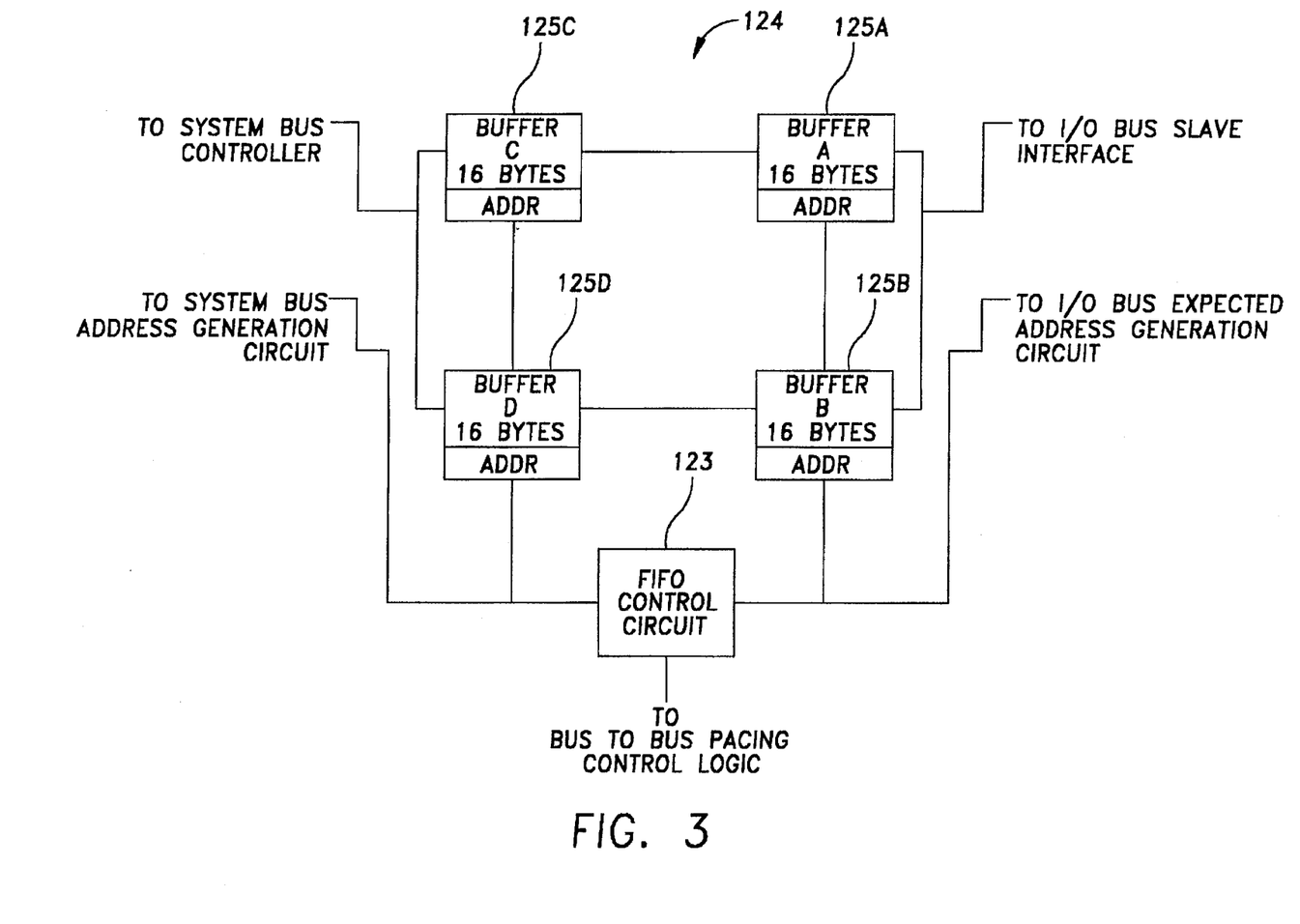
FIG. 3 is a schematic block diagram of the FIFO buffer of the bus interface unit of FIG. 2.

As shown in FIG. 3, FIFO buffer 124 is a dual ported, asynchronous, bi-directional storage unit which provides temporary storage of data information between the system and I/O buses 76, 32. FIFO buffer 124 comprises four sixteen-byte buffers 125A–125D and FIFO control circuit 123. The four buffers 125A–125D buffer data to and from I/O bus controllers and system bus slaves, thereby allowing simultaneous operation of the I/O bus 32 and the system bus 76. The FIFO buffer 124 is physically organized as two thirty-two byte buffers (125A/125B and 125C/125D). The system bus controller interface 122 and the I/O bus slave interface 126 each control one thirty-two byte buffer while the other thirty-two byte buffer operates transparent to them. Both of the thirty-two byte buffers are utilized for read and write operations.

Each FIFO 124A, 125B, 125C, 125D has an address register section either physically associated with the respective FIFO, or logically associated therewith. As data is transferred from the I/O bus 32 to FIFO 125A, the data will be accumulated until the 16 byte buffer is filled with 16 bytes of data, provided that the addresses are contiguous. If a non-contiguous address is detected by the address action, the FIFO 125A will transfer the stored data to FIFO 125C, and at the same time FIFO 125B will start to receive this data from the new non-contiguous address. FIFO 125B will continue just as FIFO 125A did until it is filled with 16 bytes of data, or another non-contiguous address is detected. FIFO 125B will then transfer the stored data to FIFO 125D, and FIFO 125A again starts to store data; thus, it is possible to store up to four 16 byte blocks of non-contiguous address data.

Further, by having two 32 byte buffers in parallel the reading and writing of data can be toggled between them thus giving an essentially continuous read or write function.

Moreover, by splitting the 32 byte buffers into two 16 bytes buffer sections which are coupled to other I/O bus 32 or system bus 26, the number of storage buffers can be increased with minimal impact on the performance of the FIFO as related to the capacitive loading on signals clocking data in or out of the storage registers. This is accomplished because for every two buffers added (in parallel) only half the capacitive loading is added to the loading of clock signals on each bus.

Additionally, by having two 16 byte buffers in series in each leg, once one of the 16 byte buffers is filled with data, such as in a read operation, the data can be transferred to the other 16 byte buffers in series therewith, while the other parallel leg is accumulating data. Hence, there is no time lost in either accumulating data, or transferring the data from one bus to the other.

The logic for controlling the operation of the FIFO 124 is supplied by FIFO Control Circuit 123.

A particular I/O device 28 may write to system memories 24 or 26 via I/O bus in bandwidths of either 1, 2 or 4 bytes (i.e., 8, 16 or 32 bits). During writes to system memory by an I/O device 28, the first transfer of write data is initially stored in the FIFO buffer 125A or 125B. The I/O bus expected address generation circuit 120 calculates the next expected, or contiguous, address. The next contiguous address is checked against the subsequent I/O address to verify if the subsequent transfers are contiguous or not. If contiguous, the second byte or bytes of write data is sent to the same FIFO buffer 125A or 125B. The FIFO receives data at asynchronous speeds of up to 40 megabytes per second from the I/O bus 32.

This process continues until either buffer 125A or 125B is full with a 16-byte packet of information or a non-contiguous address is detected. On the next clock cycle, assuming that buffer 125A is full, the data in buffer 125A is transferred to buffer 125C. Similarly, when buffer 125B is full, all of its contents are transferred to buffer 125D in a single clock cycle. The data stored in the buffers 125C and 125D is then written to system memory via an i486 burst transfer at the system bus operational speed. The operation of FIFO buffer 124 during a write to system memory by an I/O device is thus continuous, alternating between buffers 125A and 125B, with each emptying into adjacent buffer 125C or 125D, respectively, while the other is receiving data to be written to system memory. The FIFO buffer 124, then, optimizes the speed of data writes to system memory by (i) anticipating the address of the next likely byte of data to be written into memory and (ii) accommodating the maximum speed of write data from the FIFO buffer to system memory via the system bus 76.

During reads of data from system memory to an I/O device 28, FIFO buffer 124 operates differently. The system bus address generation circuit 118 uses the initial read address to generate subsequent read addresses of read data and accumulate data in buffer 125C or 125D. Because the system bus supports transfers in bandwidths of 16 bytes wide, the system bus controller interface 122 may prefetch 16-byte packets of contiguous data and store it in buffers 125C or 125D without the I/O bus 32 actually providing subsequent addresses, thus reducing latency between transfers. When buffer 125C is full of prefetched data, it transfers its contents to buffer 125A in one clock cycle. Buffer 125D similarly empties into buffer 125B when full. The data in buffers 125A and 125B may then be read by a particular I/O device controller in bandwidths of 1, 2 or 4 bytes. In this way, system bus address generation circuit 118 functions as an increment counter until instructed to by the I/O controller device to stop prefetching data.

Bus to bus pacing control logic 128 creates a faster access to system memory for high speed I/O devices. The bus to bus pacing control logic 128 overrides the normal memory controller arbitration scheme of system 10 by allowing an I/O device in control of the I/O bus 32 uninterrupted access to system memory during transfers of data by faster devices which require multiple cycles, rather than alternating access to the memory controller 58 between the I/O device and the CPU. Thus, even if a local device such as the CPU has a pending request for control of the memory bus during a multiple cycle transmission by an I/O device, the bus to bus pacing control logic 128 will grant the I/O device continued control of the memory bus.

The programmed I/O circuit 116 is the portion of the bus interface unit 64 which contains all of the registers which are programmable within the bus interface unit 64. The registers have bits associated therewith to determine whether a particular register is active or inactive. These registers define, inter alia, the system memory and expansion memory address ranges to which the bus interface unit 64 will respond, the expansion memory addresses which are either cacheable or noncacheable, the system memory or cache address ranges, and whether or not parity or error checking is supported by the bus interface unit. Accordingly, programmed I/O circuit 116 identifies for the bus interface unit 64 the environment in which it resides, and the options to which it is configured. The registers in programmed I/O circuit 116 cannot be programmed directly over the I/O bus 32. Hence, in order to program the system 10, the user must have access to an I/O device which may communicate over the system bus to the programmed I/O circuit 116 at the CPU level.

Memory address compare logic 110 determines if a memory address corresponds to system memory or corresponds to expansion memory which is located on I/O device 28 coupled to the I/O bus 32. Because the system memory as well as the expansion memory may be in non-contiguous blocks of addresses, memory address compare logic 110 includes a plurality of comparators which are loaded with boundary information from registers in the programmed I/O circuit 116 to indicate which boundaries correspond to which memory. After a particular memory address is compared with the boundary information by the memory address compare logic, the bus interface unit is prepared to react accordingly. For example, if an I/O device controlling the I/O bus 32 is reading or writing to expansion memory, the bus interface circuit need not pass that address to the memory controller 58, thereby saving time and memory bandwidth.

Error recovery support logic 112 permits the system 10 to continue operations even if a data parity error is detected. On any read or write access by an I/O device 28 to system memories 24 or 26, parity of the data is checked. Support logic 112 interacts with a register in the programmed I/O circuit 116 for capturing the address and the time of the detected parity error. The contents of this register may then be acted upon by appropriate system software. For example, the CPU 38 may be programmed for a high level interrupt to pull the address out of the register at any time a parity error is detected. The CPU may then decide, based on the system software instructions, whether to continue system operations or merely terminate operation of the identified source of the parity error.

Cache snooping logic 114 permits the bus interface unit 64 to monitor the I/O bus 32 for any writes to expansion memory by an I/O device taking place over the I/O bus 32. The snooping logic first determines if the write to expansion memory occurred in expansion memory which is cacheable in SRAM 40. If it is not cacheable expansion memory, there is no danger of corrupt data being cached. If, however, a positive compare indicates that the write occurred in cacheable expansion memory, a cache invalidation cycle is initiated over the system bus 76. The CPU is thus instructed to invalidate the corresponding address in SRAM 40. Cache snooping logic 114 provides means to store the address of a positive compare so that snooping of the I/O bus may continue immediately after detection of the first positive compare, thereby permitting continuous monitoring of the I/O bus 32.

Bus pacing control logic 128 is used to improve the ability of the I/O bus 32 to move data in and out of system memories 24 and 26 by dynamically controlling access of an I/O device to system memory. System performance is improved by locking the access of an I/O device 28 in control of the I/O bus 32 to system memory under certain predetermined conditions.

The bus to bus pacing control logic 128, in conjunction with FIFO buffer 124, is used to optimally match the data transfer speed of I/O bus controllers to the data transfer capability of the system memory. If, for example, a high speed I/O controller can write to system memory faster than the system memory can accept the write data, the buffered write data will fill the FIFO buffers 125A-2125B completely before the data can be written to system memory. If the same high speed I/O controller can also read data from system memory faster than system memory can provide the read data, prefetched data will not be available in the FIFO buffers 125C and 125D. In either case, the result is increased latency, and hence decreased performance, in data transfer as seen by the I/O bus 32.

Typically, an I/O device controller will initiate a read or write operation and provide a memory address over the I/O bus 32 to the bus interface unit 64. Circuit 110 of the bus interface unit compares this address to a range of addresses programmed in circuit 116 to determine if the operation is destined for expansion memory or system memory. If it is determined that the operation is destined for expansion memory, bus to bus pacing control logic 128 does nothing, as there is no need to prioritize access to system memory under this condition. If, however, it is determined that the read or write operation is destined for system memories 24 or 26, and the predetermined conditions are met, the pacing control logic 128 initiates a signal which grants an I/O device 28 in control of the I/O bus 32 continued priority access to system memory. This signal acts as an override to the arbitration grant signal output by the memory controller 58 during normal arbitration procedures.

The predetermined conditions under which an I/O device is granted priority access to system memory are as follows: (1) a read request (prefetch) by an I/O device controlling the I/O bus 32 is not aligned with a predefined 16-byte address boundary in system memory, (2) an I/O device controlling the I/O bus 32 immediately follows a write cycle with a read cycle, (3) an I/O device controlling the I/O bus 32 completes a data transfer cycle, (4) an I/O device controlling the I/O bus 32 is reading or writing data in streaming mode (40 megabytes per second), or (5) more than two of the four 16-byte buffers in FIFO buffer 124 are already filled with data to be written to system memory or less than two of the four 16-byte buffers are yet to be filled with prefetched data to be read from system memory.

In the preferred embodiment of the present invention, the bus to bus pacing control logic 128 operates under three modes. The first of these modes is the default mode, which determines pacing of bus control for the first three conditions listed above. The second of these modes (option 1) determines pacing for the fourth listed condition, and the third of these modes (option 2) determines pacing for the fifth listed condition. A user of the system may choose either pacing mode (option 1 or option 2) in addition to the default pacing mode which the system automatically provides. The choice is made by programming the contents of a 3-bit register 130 (not shown) in programmed I/O circuit 116. The default pacing mode is defined by a 0-0-0 register content; option 1 is defined by a 0-0-1 register content; and option 2 is defined by a 1-0-0 register content.

As explained above, the default pacing logic handles pacing for the first three pacing conditions. Under the first condition, an I/O device 28 requests a read of system memories 24 or 26 which is not aligned with a particular 16-byte packet boundary, meaning that the read request is for data addresses which begin somewhere within the boundaries of a 16-byte packet. If the read data were aligned with the boundaries of a particular 16-byte packet, the system bus address generation circuit 118 would simply do a standard 16-byte burst transfer of the data into either buffer 125C or 125D. However, if the read data is not packet aligned, the data must be prefetched using multiple 1, 2, 3, 4 byte cycles. To insure that this data is prefetched in the most efficient manner, access by the I/O device 28 to system memory is locked while enough data is automatically prefetched to arrive at a 16-byte boundary. This read data of less than 16-bytes is then synchronized to the timing of the I/O bus 32, and the I/O device controller begins to read the data. In parallel with the I/O device controller reading data, the system bus address generation circuit 118 will prefetch the next contiguous 16-byte packet before releasing the lock signal to system memory. Because this 16-byte packet begins at a predefined boundary, a burst transfer is possible. Thus, two transfers of data are performed without interruption. Use of the lock signal 140 in FIG. 4 in this condition insures the least amount of latency between when a device on I/O bus 32 requests data and when bus interface unit 64 prerides data, and the most efficient use of page made system memory.

Under the second condition, residual buffered write data may exist in FIFO buffers 125A-125D when the I/O device 28 changes from a write transfer to a read request. Once the I/O device bus controller changes from a write to a read, pacing control logic 128 determines that an end of cycle has occurred, that there is no more write data to be stored in the FIFO buffer 124, and that read data is now being requested from system memories 24 or 26. Because it is known that no more contiguous write data is immediately forthcoming, the buffered data in buffers 125A-125D is written to system memory and the read request is prefetched from system memory in one atomic operation.

Under the third condition, residual buffered data may also exist in FIFO buffers 125A-125D when the I/O controller device relinquishes control of the I/O bus 32. In this instance, such residual data must be written to system memory before releasing the system bus 76. If more than one of the FIFO buffers 125A-125D include such residual data, as soon as the I/O device controller relinquishes control of the I/O bus 32, the pacing logic 128 will generate a signal to the memory controller to indicate that data in FIFO buffer 124 exceeds one transfer in length (i.e., greater than 16 bytes) and needs to be written to system memories 24 or 26. Use of the lock signal 140 in this condition insures the least amount of latency between the I/O controller releasing control of the I/O bus 32 and the bus interface unit 64 releasing control of system bus 76.

Figure 4:
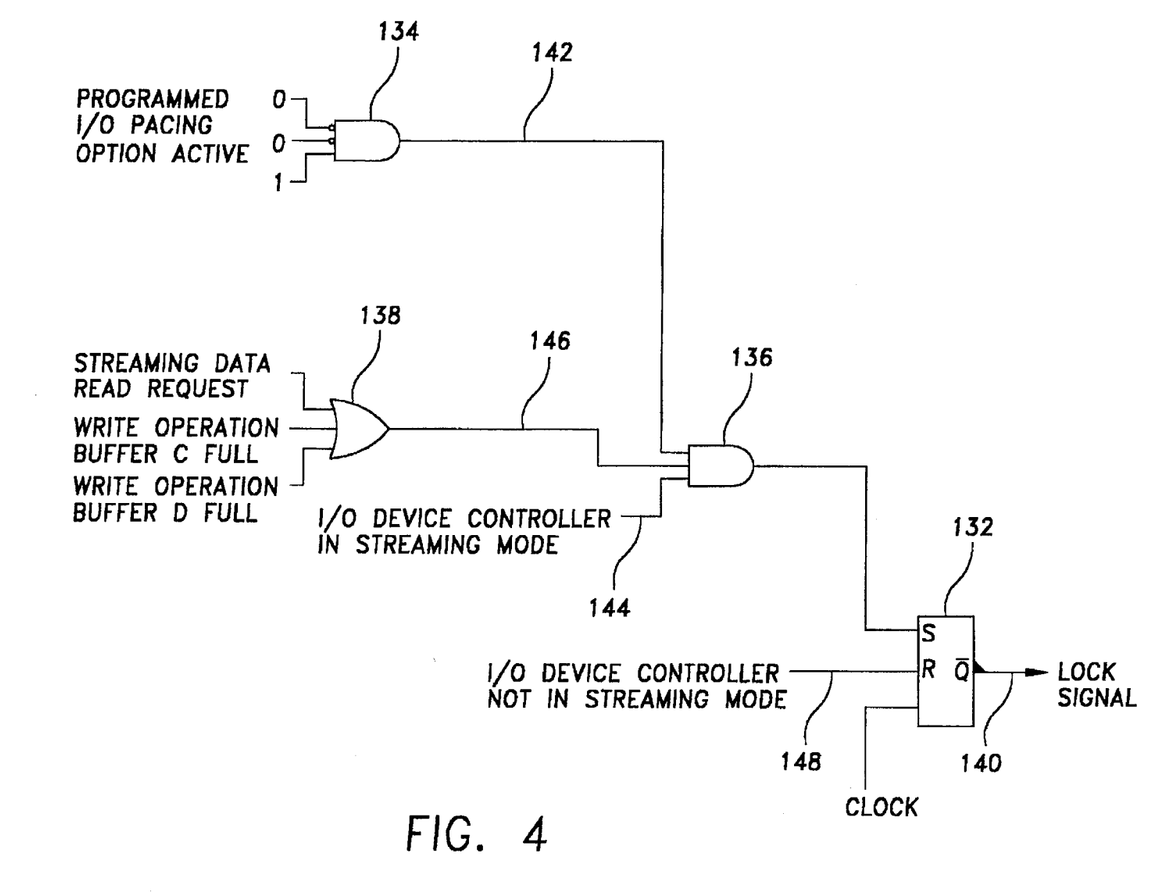
FIG. 4 is circuit diagram of the control logic used to implement one of the embodiments of the bus to bus pacing logic of FIG. 3.
Figure 5:
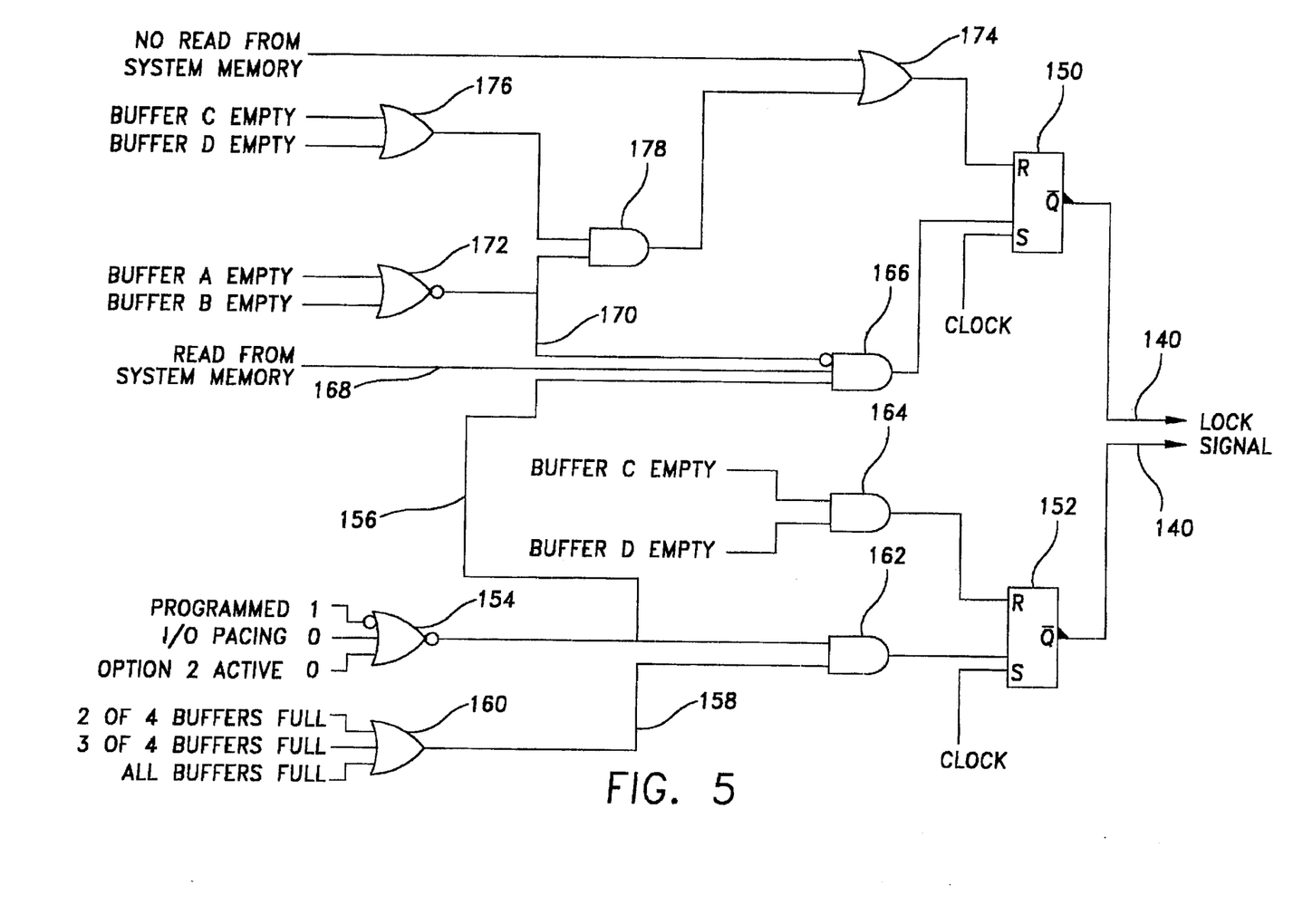
FIG. 5 is a circuit diagram of the control logic used to implement another embodiment of the bus to bus pacing logic of FIG. 3.

The default logic which responds to the first three conditions is realized by algorithms which are built into the hardware of the bus interface unit 64. Typically, state machines may be used to implement the required logic, as is known in the art. The pacing logic which responds to the fourth and fifth listed conditions is also realized by algorithms which are built into the bus interface unit hardware. FIGS. 4 and 5 illustrate circuit diagrams used to implement particular embodiments of the bus to bus pacing control logic 128 for option 1 and option 2, respectively.

Referring to FIG. 4, the bus to bus pacing control logic for implementing option 1 (relating to the fourth condition described above) comprises a clocked S-R latch 132, AND gates 134 and 136, and OR gate 138. At any time the latch 132 is set (S-input active), the latch outputs a LOCK signal 140. The LOCK signal 140 provides an I/O device 28 in control of the I/O bus 32 continued access to system memory when the I/O device 28 is reading or writing data to system memories 24 and 26 in streaming mode. Streaming refers to data transfer to the same address, which can be accomplished more quickly than data transfer to different addresses.

Upon detection of a streaming data write operation by the logic of FIG. 4, and either of FIFO buffers 125C or 125D is full with a 16-byte packet of buffered write data, the lock signal is activated and a burst write sequence is initiated to system memory over the system bus 76 and will remain active until the I/O device 28 terminates the streaming sequence or until there is no data remaining in the FIFO buffers. Similarly, upon detection of a streaming data read operation, the lock signal is activated and a burst read sequence is initiated to system memory and will remain active as long as there is room in the FIFO or until the I/O device 28 terminates the streaming sequence. Bus control logic 128 responsive to streaming reads or writes is defined by programming a 0-0-1 register content in the 3-bit register 130. Hence, if the 3-bit register is programmed to 0-0-1, AND gate 134 will decode the content of the register and provide a HIGH option 1 enable line 142. Line 144 will also be HIGH as long as the bus interface unit 64 detects that the particular I/O device 28 in control of the I/O bus 32 is writing or reading data in streaming mode. Because lines 142 and 144 are HIGH during this time, AND gate 136 will set the latch 132 to output LOCK signal 140 any time output 146 of OR gate 138 is HIGH.

Output 146 of OR gate 138 is HIGH when either (i) the I/O device 28 in control of the I/O bus 32 issues a streaming data read request (read operations) or (i) either of 16-byte buffers 125C or 125D in FIFO 124 is full (write operations). In either of these instances, and with lines 142 and 144 HIGH as explained above, the latch 132 will override the arbitration scheme of memory controller 58 by providing the memory controller with a LOCK signal 140. Whenever the I/O device 28 indicates that it is no longer transmitting read or write data in streaming mode, line 148 goes HIGH, thereby resetting the latch 132 and effectively disabling the logic of FIG. 4.

Referring to FIG. 5, the bus to bus control logic for implementing option 2 (relating to the fifth condition described above) comprises clocked S-R latches 150 and 152, each of which is controlled independently by separate logic paths for read and write cycles. At any time either of these clocked latches 150, 152 are set, LOCK signal 140 is enabled and output to the memory controller 58. The latches are reset by activating the R-input, thereby disabling the latches from outputting the LOCK signal.

Under the fifth condition listed above, either (i) data is being written by an I/O controller 28 over I/O bus 32 and to bus interface unit 64 faster than it can be written over system bus 76 to system memory, or (ii) data is being read from the bus interface unit 64 by the I/O controller 28 faster than bus interface unit can prefetch data from system memory. If data is being written too fast by an I/O controller, residual data begins building up in FIFO buffers 125A–125D. If more than half of the FIFO buffer space contains such residual data, a LOCK signal 140 is initiated by latch 152 to permit atomic transfers to system memory. If data is being read too quickly from bus interface unit 64 by I/O controller 28 over I/O bus 32, FIFO buffers 125A or 125B will empty, meaning that buffers 125C and 125D are depleted of available prefetched contiguous data. A LOCK signal 140 is thus output by latch 150 so that the bus interface unit may prefetch data into buffers 125C and 125D. Accordingly, at least half of the FIFO buffer 124 is maintained filled with prefetched data.

Bus control logic responsive to the fifth condition is defined by programming a 1-0-0 register content in the 3-bit register 130. Hence, if the 3-bit register is programmed to 1-0-0, NOR gate 154 will decode the content of the register and provide a HIGH option 2 enable line 156. The option 2 enable line 156 is used to enable the control logic responsive to both data read operations (the upper half of logic of FIG. 5) and data write operations (the lower half of logic of FIG. 5).

During write operations, the output 156 of OR gate 158 will also be HIGH as long as at least two of the buffers 125A–125D are full. Typically, this means that either buffer 125A or 125B has been filled and transferred data to buffer 125C or 125D, respectively, and the other of buffers 125A or 125B is now being filled. In this case, data is in either buffer 125C or 125D, or both, and can immediately be written to system memory. With lines 156 and 158 HIGH, then, AND gate 162 will set latch 152 which will then output the LOCK signal 140 to the memory controller 58. The LOCK signal 140 will remain active until the R-input of latch 152 is driven HIGH by the output of AND gate 164. AND gate 164 output goes HIGH if both buffer 125C and 125D are empty, thereby indicating that there is no need to immediately write data to system memory from these buffers.

During read operations, latch 150 will output the LOCK signal to memory controller 58 when the latch 150 is set by a HIGH output of AND gate 166. The output of AND gate 166 is driven high when (i) line 156 is HIGH due to option 2 being active, (ii) line 168 is HIGH due to the bus interface unit 64 detecting a read from system memory, and (iii) line 170 is driven LOW by NAND gate 172 at any time either buffer 125A or 125B is empty. A LOCK signal is initiated in this case because, with either buffer 125A or 125B empty, the contents of buffers 125C or 125D may be emptied therein, leaving room in either buffer 125C or 125D for prefetched contiguous data from system memory.

The LOCK signal in read operations remains active until the R-input of latch 150 is activated by OR gate 174. OR gate 174 is driven HIGH any time (i) the bus interface unit 64 detects that there is no read from system memory or (ii) either of buffers 125C and 125D is full and neither of buffers 125A and 125B is empty. In either of these two cases, the LOCK signal is not necessary, and, accordingly, the latch 150 is reset. Access to system memories 24 and 26 is then controlled under the normal arbitration scheme implemented by the memory controller 58.

Accordingly, the preferred embodiment of an asynchronous bidirectional storage facility in a bus interface unit for computers having dual bus architecture has been described.

With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. A computer system, comprising:

system memory;

a memory controller for controlling access to system memory, said system memory and said memory controller connected by a memory bus;

a central processing unit coupled to said memory controller through a local bus, said central processing unit being connected to read data from and write data to said system memory over said local bus and said memory bus by performing read and write operations;

a bus interface unit connected with said memory controller by a system bus;

at least one input/output (I/O) device connected to said bus interface unit by an I/O bus for reading data from and writing data to said system memory over said bus interface unit;

said bus interface unit including a bidirectional data storage unit to provide temporary storage of data being transferred between said system bus and said I/O bus during read and write operations performed by said at least one I/O device, said bidirectional storage unit comprising (i) a first pair of buffers connected in series between said I/O bus and said system bus, and (ii) a second pair of buffers connected in series between said I/O bus and said system bus and in parallel with said first pair of buffers, each of said buffers in each of said pairs being used for bidirectional data transfer between said system bus and said I/O bus wherein first and second sets of data originating on either one of said system bus or said I/O bus and destined for transfer in one direction to the other one of said system bus or said I/O bus are transferred to the bidirectional storage unit so that (a) said first set of data is stored in one buffer of one of the pairs of series-connected buffers, and (b) (1) said stored first set of data contained in said one buffer of one of the pairs of series-connected buffers is transferred to the other buffer in said one of the pairs while, simultaneously, (b) (2) said second set of data is transferred into one buffer of the other series-connected pair of buffers; wherein one of said first pair of buffers and one of said second pair of buffers is connected to said system bus, each of said system-bus connected buffers capable of simultaneously transferring data over said system bus.

2. The computer system of claim 1, wherein said at least one I/O device comprises a plurality of I/O devices and wherein data is transferred between each of said plurality of I/O devices and said bidirectional storage unit over said I/O bus at different bandwidths.

3. The computer system of claim 1 wherein each pair of buffers stores thirty-two bytes of data.

4. The computer system of claim 3 wherein each of said thirty-two byte pair of buffers includes two sixteen byte buffers connected in series.

5. The computer system of claim 1 wherein said buffers are configured to read and write over said I/O bus at a speed at which said I/O device operates and over said system bus at a given data burst speed.

6. A method of controlling data transfer between a system memory connected to a system bus and at least one input/output (I/O) device connected to an I/O bus in a computer system, wherein said system bus is coupled to said I/O bus by a bus interface unit comprising a first pair of buffers connected in series between said I/O bus and said system bus, and a second pair of buffers connected in series between said I/O bus and said system bus and in parallel with said first pair of buffers, the method comprising the steps of:

transferring first and second sets of data originating on said I/O bus and destined for transfer in one direction to said system bus across said bus interface unit by:

(a) temporarily storing said first set of data in one buffer of one of the pairs of series-connected buffers; simultaneously, (b) (1) transferring said stored first set of data contained in said one buffer of one of the pairs of series-connected buffers to the other buffer in said one of the pairs; and (b) (2) transferring said second set of data into one buffer of the other series-connected pair of buffers;

(c) transferring said second set of data from said one buffer of said other series-connected pair of buffers to the other buffer of said other series-connected pair of buffers; and (d) (1) transferring said first set of data over said system bus from said other buffer in said one of the pairs of series-connected buffers while simultaneously (d) (2) transferring said second set of data over said system bus from said other buffer of said other series-connected pair of buffers.

7. The method of claim 6, wherein said at least one I/O device comprises a plurality of I/O devices and wherein data is transferred between each of said I/O devices and said bus interface unit over said I/O bus at different bandwidths.

8. The method of claim 6, wherein said buffers are configured to read and write over said I/O bus at a speed at which said selected I/O device operates and over said system bus at a given data burst speed.

9. The method of claim 6, wherein said system bus transfers read or write data between said bus interface unit and said system bus in bandwidths of up to 16 bytes, and wherein said I/O bus transfers read or write data between said input/output device and said bus interface unit in bandwidths of up to four bytes.

10. The method of claim 6, wherein data is passed through said buffers in said bus interface unit in a first-in, first-out procedure.

11. The method of claim 6, wherein each of said buffers in each of said buffers pairs in said bus interface unit is used for bidiredtional data transfer between said system bus and said I/O bus.

* * * * *